US012578967B2

(12) United States Patent
Sugumar

(10) Patent No.: US 12,578,967 B2
(45) Date of Patent: Mar. 17, 2026

(54) OUT-OF-ORDER UNIT STRIDE DATA PREFETCHER WITH SCOREBOARDING

(71) Applicant: Akeana, Inc., San Jose, CA (US)

(72) Inventor: Rabin Sugumar, Sunnyvale, CA (US)

(73) Assignee: Akeana, Inc., Santa Clara, CA (US)

( * ) Notice: Subject to any disclaimer, the term of this patent is extended or adjusted under 35 U.S.C. 154(b) by 143 days.

(21) Appl. No.: 18/652,253

(22) Filed: May 1, 2024

(65) Prior Publication Data

US 2026/0003631 A1     Jan. 1, 2026

Related U.S. Application Data

(60) Provisional application No. 63/570,281, filed on Mar. 27, 2024, provisional application No. 63/564,529, filed on Mar. 13, 2024, provisional application No. 63/563,102, filed on Mar. 8, 2024, provisional application No. 63/556,944, filed on Feb. 23, 2024, provisional application No. 63/556,951, filed on Feb. 23, 2024, provisional application No. 63/605,620, filed on Dec. 4, 2023, provisional application No. 63/602,514, filed on Nov. 24, 2023, provisional application No. 63/547,574, filed on Nov. 7, 2023, provisional application No. 63/547,404, filed on Nov. 6, 2023, provisional application No. 63/546,769, filed on Nov. 1, 2023, provisional application No. 63/545,961, filed on Oct. 27, 2023, provisional application No. 63/542,797, filed on Oct. 6, 2023, (Continued)

(51) Int. Cl.
G06F 9/38     (2018.01)
G06F 9/30     (2018.01)

(52) U.S. Cl.
CPC ........ *G06F 9/3838* (2013.01); *G06F 9/30032* (2013.01); *G06F 9/30047* (2013.01); *G06F 9/3814* (2013.01)

(58) Field of Classification Search
CPC .............. G06F 9/3838; G06F 9/30032; G06F 9/30047; G06F 9/3814
USPC ........................................................ 712/207
See application file for complete search history.

(56) References Cited

U.S. PATENT DOCUMENTS 6,934,809 B2     8/2005   Tremblay et al.
7,506,105 B2     3/2009   Al-Sukhni et al.
(Continued)

FOREIGN PATENT DOCUMENTS

WO          2022117687 A1     6/2022

*Primary Examiner* — Chun Kuan Lee
(74) *Attorney, Agent, or Firm* — Adams Intellex, PLC

(57)     ABSTRACT

Disclosed embodiments provide techniques for prefetching. A processor core that executes instructions out of order (OOO) is accessed. The processor core includes a local cache hierarchy, data prefetch logic, and a prefetch table and is coupled to an external memory system. A first load instruction with a first address is detected and causes a miss in the local cache hierarchy. Information pertaining to the first load instruction is saved in an entry of the prefetch table. The information includes the first address, a confidence count, and an out-of-order mask. A second load instruction with a second address is identified. The information is updated based on the detecting. The information is advanced. The second address is the next sequential address after the first address. The advancing is based on the detecting. One or more data prefetch instructions are issued to the second address plus an offset.

21 Claims, 7 Drawing Sheets

Related U.S. Application Data provisional application No. 63/526,009, filed on Jul. 11, 2023, provisional application No. 63/521,365, filed on Jun. 16, 2023, provisional application No. 63/471,283, filed on Jun. 6, 2023, provisional application No. 63/467,335, filed on May 18, 2023, provisional application No. 63/463,371, filed on May 2, 2023, provisional application No. 63/563,492, filed on Mar. 11, 2024, provisional application No. 63/640,921, filed on May 1, 2024, provisional application No. 63/641,045, filed on May 1, 2024.

(56) References Cited

U.S. PATENT DOCUMENTS

| | | | |
|---|---|---|---|
| 8,949,522 B1 * | 2/2015 | Garg | G06F 13/385 |
| | | | 711/E12.078 |
| 9,672,154 B1 | 6/2017 | Hsu et al. | |
| 9,830,097 B2 | 11/2017 | Susarla et al. | |
| 10,013,356 B2 | 7/2018 | Chou | |
| 10,031,851 B2 | 7/2018 | Sundaram et al. | |
| 10,671,394 B2 | 6/2020 | Britto et al. | |
| 10,929,948 B2 | 2/2021 | Benthin et al. | |
| 11,163,684 B1 | 11/2021 | Gray et al. | |
| 11,288,405 B2 | 3/2022 | Belgarric et al. | |
| 11,385,896 B2 | 7/2022 | Shulyak et al. | |
| 11,403,099 B2 | 8/2022 | Cerny et al. | |
| 11,403,225 B2 | 8/2022 | Zheng et al. | |
| 11,429,529 B2 | 8/2022 | Hornung et al. | |
| 11,442,863 B2 | 9/2022 | Shulyak et al. | |
| 11,474,130 B2 | 10/2022 | Lentz et al. | |
| 11,486,911 B2 | 11/2022 | Tuncer et al. | |
| 2011/0320523 A1 * | 12/2011 | Chan | G06F 16/182 |
| | | | 709/203 |
| 2022/0004639 A1 | 1/2022 | Yardi et al. | |
| 2022/0029780 A1 | 1/2022 | Dafali | |
| 2022/0197657 A1 | 6/2022 | Soundararajan et al. | |
| 2023/0205699 A1 * | 6/2023 | Sha | G06F 9/3816 |
| | | | 711/137 |
| 2024/0184581 A1 * | 6/2024 | Alexander | G06F 12/0862 |

* cited by examiner

OUT-OF-ORDER UNIT STRIDE DATA PREFETCHER WITH SCOREBOARDING

RELATED APPLICATIONS

This application claims the benefit of U.S. provisional patent applications "Out-Of-Order Unit Stride Data Prefetcher With Scoreboarding" Ser. No. 63/463,371, filed May 2, 2023, "Architectural Reduction Of Voltage And Clock Attach Windows" Ser. No. 63/467,335, filed May 18, 2023, "Coherent Hierarchical Cache Line Tracking" Ser. No. 63/471,283, filed Jun. 6, 2023, "Direct Cache Transfer With Shared Cache Lines" Ser. No. 63/521,365, filed Jun. 16, 2023, "Polarity-Based Data Prefetcher With Underlying Stride Detection" Ser. No. 63/526,009, filed Jul. 11, 2023, "Mixed-Source Dependency Control" Ser. No. 63/542,797, filed Oct. 6, 2023, "Vector Scatter And Gather With Single Memory Access" Ser. No. 63/545,961, filed Oct. 27, 2023, "Pipeline Optimization With Variable Latency Execution" Ser. No. 63/546,769, filed Nov. 1, 2023, "Cache Evict Duplication Management" Ser. No. 63/547,404, filed Nov. 6, 2023, "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, "Cache Snoop Replay Management" Ser. No. 63/605,620, filed Dec. 4, 2023, "Processing Cache Evictions In A Directory Snoop Filter With ECAM" Ser. No. 63/556,944, filed Feb. 23, 2024, "System Time Clock Synchronization On An SOC With LSB Sampling" Ser. No. 63/556,951, filed Feb. 23, 2024, "Malicious Code Detection Based On Code Profiles Generated By External Agents" Ser. No. 63/563,102, filed Mar. 8, 2024, "Processor Error Detection With Assertion Registers" Ser. No. 63/563,492, filed Mar. 11, 2024, "Starvation Avoidance In An Out-Of-Order Processor" Ser. No. 63/564,529, filed Mar. 13, 2024, "Vector Operation Sequencing For Exception Handling" Ser. No. 63/570,281, filed Mar. 27, 2024, "Vector Length Determination For Fault-Only-First Loads With Out-Of-Order Micro-Operations" Ser. No. 63/640,921, filed May 1, 2024, and "Circular Queue Management With Nondestructive Speculative Reads" Ser. No. 63/641,045, filed May 1, 2024.

Each of the foregoing applications is hereby incorporated by reference in its entirety.

FIELD OF ART

This application relates generally to computer processors and more particularly to an out-of-order unit stride data prefetcher with scoreboarding.

BACKGROUND

Computer processors are found in a wide variety of products such as smartphones, tablets, televisions, laptop computers, desktop computers, gaming consoles, automobiles, appliances, and more. Processors are used in almost every industry, from healthcare and finance to manufacturing and transportation. They help businesses operate more efficiently and enable them to make data-driven decisions. Processors also play a crucial role in home automation systems, which control various aspects of our homes through smartphones or voice-activated devices. This includes controlling lights, thermostats, security systems, and other devices. Additionally, processors are used in modern cars to control everything from the engine and transmission to the infotainment system and safety features.

Overall, processors have become essential components of modern life, powering many of the devices and systems that we rely on every day.

Main categories of processors include Complex Instruction Set Computer (CISC) types and Reduced Instruction Set Computer (RISC) types. In a CISC processor, one instruction may execute several operations. The operations can include memory storage, loading from memory, an arithmetic operation, and so on. In contrast, in a RISC processor, the instruction sets tend to be smaller than the instruction sets of CISC processors, and may be executed in a pipelined manner, having pipeline stages that may include fetch, decode, and execute. Each of these pipeline stages may take one clock cycle, and thus, the pipelined operation can allow RISC processors to operate on more than one instruction per clock cycle.

Integrated circuits (ICs) such as processors may be designed using a Hardware Description Language (HDL). Examples of such languages can include Verilog, VHDL, etc. HDLs enable the description of behavioral, register transfer, gate, and switch level logic. This provides designers with the ability to define levels in detail. Behavioral level logic allows for a set of instructions executed sequentially, while register transfer level logic allows for the transfer of data between registers, driven by an explicit clock and gate level logic. The HDL can be used to create text models that describe or express logic circuits. The models can be processed by a synthesis program, followed by a simulation program to test the logic design. Part of the process may include Register Level Transfer (RTL) abstractions that define the synthesizable data that is fed into a logic synthesis tool, which in turn creates the gate-level abstraction of the design that is used for downstream implementation operations.

The transistor count in processors has been steadily increasing over time, following a trend known as Moore's Law. Moore's Law states that the number of transistors that can be located on a microprocessor chip doubles approximately every 18-24 months. This trend has been largely driven by advancements in manufacturing processes, which have allowed for the creation of smaller and more densely packed transistors. A modem processor can contain over ten billion processors. The trend of instructions per second (IPS) in CPUs (processors) has also been steadily increasing over time. IPS refers to the number of instructions that a CPU can execute in one second, and it is a measure of the CPU's processing speed. The increase in IPS has been driven by a combination of factors, including advancements in transistor count, improvements in manufacturing processes, and the development of more efficient instruction sets. The increase in IPS, along with increased transistor count, enables new generations of processors that continue to set new benchmarks for computational power and efficiency.

SUMMARY

Processors are ubiquitous, and are now found in everything from appliances to satellites. The processors enable the devices within which the processors are located to execute a wide variety of applications. The applications include telephony, messaging, data processing, patient monitoring, vehicle access and operation control, etc. The processors are coupled to additional elements that enable the processors to execute their assigned applications. The additional elements typically include one or more of shared, common memories, communication channels, peripherals, and so on. In order to boost processor performance, and to take advantage of "locality" often found in application code that is executed by the processors, portions of the contents of the common memories can be moved to cache memory. The cache memory, which can be colocated with or closely adjacent to the processors, is often smaller and faster than the common (main) memory. The cache memory can be accessed by some or all of the processors without having to access the slower common memory, thereby reducing access time and increasing processing speed. Access by the processors to the cache memory can continue while data, instructions, etc. are available within the cache. If the requested data is not located within the cache, then a cache miss occurs.

Disclosed embodiments provide techniques for prefetching. A processor core that executes instructions out of order (OOO) is accessed. The processor core includes a local cache hierarchy, data prefetch logic, and a prefetch table and is coupled to an external memory system. A first load instruction with a first address is detected and causes a miss in the local cache hierarchy. Information pertaining to the first load instruction is saved in an entry of the prefetch table. The information includes the first address, a confidence count, and an out-of-order mask. A second load instruction with a second address is identified. The information is updated based on the detecting. The information is advanced. The second address is the next sequential address after the first address. The advancing is based on the detecting. One or more data prefetch instructions are issued to the second address plus an offset.

A processor-implemented method for prefetching is disclosed comprising: accessing a processor core, wherein the processor core executes instructions out of order (OOO), wherein the processor core includes a local cache hierarchy, data prefetch logic, and a prefetch table, and wherein the processor core is coupled to an external memory system; detecting a first load instruction with a first address, wherein the first load instruction causes a miss in the local cache hierarchy; saving, in an entry of the prefetch table, information pertaining to the first load instruction, wherein the information includes the first address, a confidence count, and an out-of-order mask, and wherein the out-of-order mask comprises a number of bits; identifying a second load instruction with a second address, wherein the second address is inclusively between the first address and a maximum address, and wherein the maximum address is the first address plus N, wherein N is the number of bits; updating the information, wherein the second address is not a next sequential address following the first address, and wherein the updating is based on the detecting; advancing the information, wherein the second address is the next sequential address after the first address and wherein the advancing is based on the detecting; and issuing one or more data prefetch instructions to the second address plus an offset, wherein the confidence count is equal to a threshold value. In embodiments, the updating further comprises determining if a representative bit in the out-of-order mask is set, wherein the representative bit indicates that the second address has been previously processed. Some embodiments comprise setting the representative bit, wherein the representative bit was previously not set. And some embodiments comprise incrementing the confidence count, wherein the confidence count is below a threshold.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
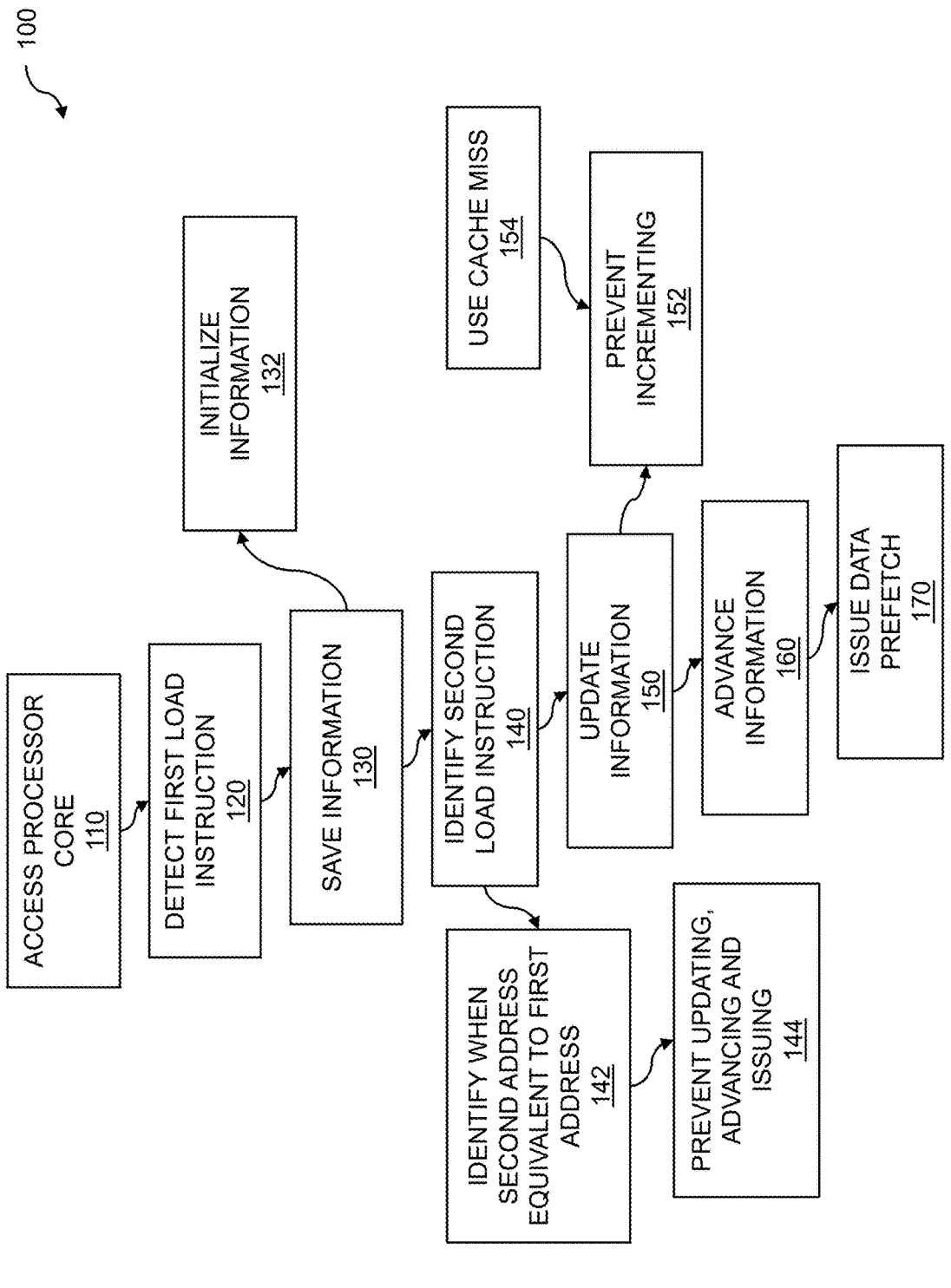
FIG. 1 is a flow diagram for an out-of-order unit stride data prefetcher with scoreboarding.

In a processor architecture, out-of-order (OOO) instructions can improve processor performance. In a pipelined processor, minimizing pipeline stalls is a key aspect of processor performance. As instructions are fetched and decoded, some instructions may have dependencies on instructions that have not yet been executed, resulting in a pipeline stall. A pipeline stall, also known as a pipeline bubble or pipeline delay, is a phenomenon that occurs in a computer processor when the pipeline is unable to execute instructions in consecutive clock cycles due to a dependency or a data hazard. In a pipelined processor, the instructions are divided into smaller stages, and each stage is executed in parallel by different hardware units. This allows multiple instructions to be processed simultaneously, which increases the overall performance of the processor. However, when an instruction depends on the result of a previous instruction that has not yet been completed, a pipeline stall occurs. To mitigate pipeline stalls, OOO execution can be used to enable the pipeline to continue executing instructions that are not dependent on the stalled instruction, while the stalled instruction is completed. In embodiments, a compiler may generate machine instructions that are out of order with respect to high-level source code that is input to the compiler, freeing a programmer from having to be concerned with low-level optimizations based on a pipelined architecture. While OOO instruction execution can help reduce pipeline stalls, it can also make it more difficult to recognize a unit stride for data prefetching, since the OOO instruction execution makes it more difficult to identify a stride pattern that can be used for subsequent data prefetching, leading to more data cache misses. A data cache miss results in an adverse performance impact, since the processors must reach out to the slower, shared, common memory for the requested data. One way to reduce data cache misses is with data prefetching. Data prefetching is a technique that reduces the data cache miss rate by fetching data from memory to a cache, ideally before the data has been demanded from the processor. However, data prefetching can be more challenging with OOO execution, since in the case of OOO execution, the order in which instructions are seen in an instruction stream may not be indicative of what should be prefetched.

A cache miss results in an adverse performance impact, since the processors must access the slower, shared, common memory for the requested data. One way to reduce cache misses is with prefetching. Prefetching is a technique that reduces the cache miss rate by fetching data from memory to a cache, ideally before the data has been demanded from the processor. A key benefit of prefetching is improved performance. By fetching instructions from memory before they are needed, the processor can reduce the amount of time it spends waiting for instructions and/or data to be loaded, leading to faster execution of programs. Additionally, prefetching instructions can help reduce memory latency by minimizing the time it takes for the processor to access data from memory. Similarly, fetching required data before it is needed can reduce stalls in a processor pipeline, leading to higher performance.

Data can be prefetched based on execution. As an example, using the principle of locality, when a block of data is fetched, one or more following blocks of data can be prefetched, and loaded into cache, which reduces the total execution time for functions using that data. The prefetching can be based on unit strides. In a unit stride prefetching system, upon fetching a block of data, one or more subsequent blocks of data can be prefetched and loaded into a data cache. In addition, a unit stride prefetching system can observe data cache misses, anticipate that a block of data may be needed in the future, and prefetch that block of data before the processor requires it for execution.

Another technique for extracting extra performance from processors is to implement out-of-order instructions. Out-of-order instructions refer to a technique used by modern processors to improve performance by executing instructions in an order that is different from the original program sequence. Normally, instructions are executed in the order in which they appear in a program. However, this can result in delays if one instruction depends on the results of another instruction that has not yet been executed. To overcome this issue, processors can use out-of-order execution to reorder instructions based on their dependencies and execute them in a more efficient way. Disclosed embodiments address these problems, and allow the benefits of OOO execution and effective unit stride prefetching within a processor architecture. This is accomplished by keeping track of encountered addresses using scoreboarding information, and identifying an address to be prefetched based on the scoreboarding information. In this way, the prefetched data can have an increased likelihood of resulting in a cache hit when requested. While both data prefetching based on stride and out-of-order instructions can improve processor performance, the two techniques can potentially interfere with each other. For efficient data prefetching, it can be helpful to identify a stride. When an instruction stream contains out-of-order instructions, identifying a stride can be challenging, since the instructions are not in order. Disclosed embodiments address the aforementioned issues, enabling the combination of out-of-order instructions along with efficient unit stride data prefetching to increase overall processor performance.

Disclosed embodiments provide techniques for data prefetching. A processor core is accessed. The processor core executes instructions out of order (OOO). The processor core includes a local cache hierarchy, data prefetch logic, and a prefetch table. The processor core is coupled to an external memory system. A first load instruction is detected with a first address, where the first load instruction causes a cache miss in the local cache hierarchy. Information pertaining to the first load instruction is saved in an entry of a prefetch table. The information includes the first address, a confidence count, and an out-of-order mask that comprises a number of bits. A second load instruction is identified, the second load instruction having a second address, where the second address is inclusively between the first address and a maximum address, and where the maximum address is the first address plus N, wherein N is the number of bits. The information is updated when the second address is not a next sequential address following the first address. When the second address is not a next sequential address, it is considered an out-of-order (OOO) instruction. The information is advanced when the second address is a next sequential address following the first address. One or more prefetch instructions to the second address plus an offset are issued, when the confidence count is equal to a threshold value.

FIG. 1 is a flow diagram 100 for an out-of-order unit stride data prefetcher with scoreboarding. The flow includes accessing a processor core 110. The processor core can be a Reduced Instruction Set Computer (RISC) core. The processor core may support instructions that can be executed in a pipelined manner, having pipeline stages that may include fetch, decode, and execute. Each of these pipeline stages may take one clock cycle, and thus, the pipelined operation can allow RISC processors to operate on more than one instruction per clock cycle. In embodiments, the processor core can include a RISC-V™ processor, ARM™ processor, MIPS™ processor, or other suitable RISC processor type. The flow includes detecting a first load instruction 120. The first load instruction can include an instruction to fetch an instruction for execution by the processor. The first load instruction may be retrieved from the local cache hierarchy, or from a higher-level cache (L2/L3), or from main memory or other storage. The flow includes saving information 130. The information can be saved in a prefetch table. The prefetch table can include multiple entries (rows), where each entry corresponds or relates to a data location that is fetched. In embodiments, the saved information includes the first address, a confidence count, and an out-of-order mask. The out-of-order mask comprises a number of bits M. In one or more embodiments, M can range from 8 bits to 32 bits. In some embodiments, M can have less than 8 bits or more than 32 bits.

The flow 100 further includes initializing information 132. The initializing can include initializing the out-of-order mask and confidence counter associated with the first load instruction. In one or more embodiments, values for the out-of-order mask and confidence counter are zeroed as a result of the initialization. The address field is initialized to the address associated with the first load instruction. The first load instruction can be initiated by the processor when a data cache miss occurs. The flow 100 further includes identifying a second load instruction 140. The second load instruction may be retrieved from the local cache hierarchy, from a higher-level cache (L2/L3), or from main memory or other storage. The second load instruction can be initiated by the processor when a data cache miss occurs. The flow 100 includes updating information 150. In one or more embodiments, the updating occurs in response to an OOO instruction immediately following the first instruction. Thus, in one or more embodiments, the updating occurs in response to detecting that the second address is not a next sequential address following the first address.

The flow 100 further includes preventing incrementing 152. In one or more embodiments, preventing incrementing includes preventing incrementing the confidence count. In one or more embodiments, the confidence count is incremented until it reaches a predetermined threshold. Once the confidence count reaches the predetermined threshold, the data prefetching logic enters a saturation state. In one or more embodiments, data prefetching only occurs when the data prefetching logic is in the saturation state, and data prefetching does not occur when the data prefetching logic is not in the saturation state. In embodiments, the threshold is programmable. In some embodiments, the threshold is programmed by writing a value into a configuration register in the processor. In embodiments, the predetermined threshold for the saturation state is a value ranging from 3 to 8.

Other value ranges are possible in disclosed embodiments. The flow 100 can include using a cache miss 154. In one or more embodiments, the data prefetching logic can use a data cache miss as a criterion for incrementing the confidence count. Thus, by only advancing the confidence count under a data cache miss, a more conservative data prefetching approach is obtained once the confidence count is saturated. In one or more embodiments, an instruction is only prefetched when the currently fetched instruction resulted in a data cache miss. Alternatively, in some embodiments, the confidence count can be incremented regardless of whether the currently fetched instruction resulted in a data cache miss or a data cache hit. This mode of operation results in more aggressive prefetching once the confidence count is saturated. Thus, the aggressive mode of data prefetching prefetches regardless of the data cache miss status, whereas the conservative mode only prefetches when the previous data fetch resulted in a cache miss. In one or more embodiments, the data prefetching mode (aggressive or conservative) can be set via a bit in a programmable register within the processor. This register can be set as part of an initialization or boot-up sequence. Thus, disclosed embodiments can include a first data prefetching mode that prefetches data only when a cache miss occurs, and a second data prefetching mode that prefetches data regardless of the most recent cache outcome status (hit or miss). The first prefetching mode is more conservative than the second prefetching mode. In embodiments, the data prefetching mode can be configured via setting a bit in a register, and/or another suitable technique. Embodiments can include preventing the incrementing the confidence count, wherein the confidence count is below a threshold, unless the second load instruction causes a miss in the local cache hierarchy.

The flow 100 can include advancing the information 160. In embodiments, advancing the information includes shifting, to the right, the out-of-order mask by one bit. The bits correlate to previously fetched data addresses. The data prefetching logic uses the bits in the out-of-order mask as an input to computing a new data prefetching address. The flow continues to where the data prefetch is issued 170, using the new data prefetching address that was computed. The flow 100 can include identifying when the address corresponding to a second data prefetch instruction is equivalent to the address corresponding to the first data prefetch instruction at 142. In response to the identifying, the flow 100 includes preventing the updating, advancing, and issuing 144.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
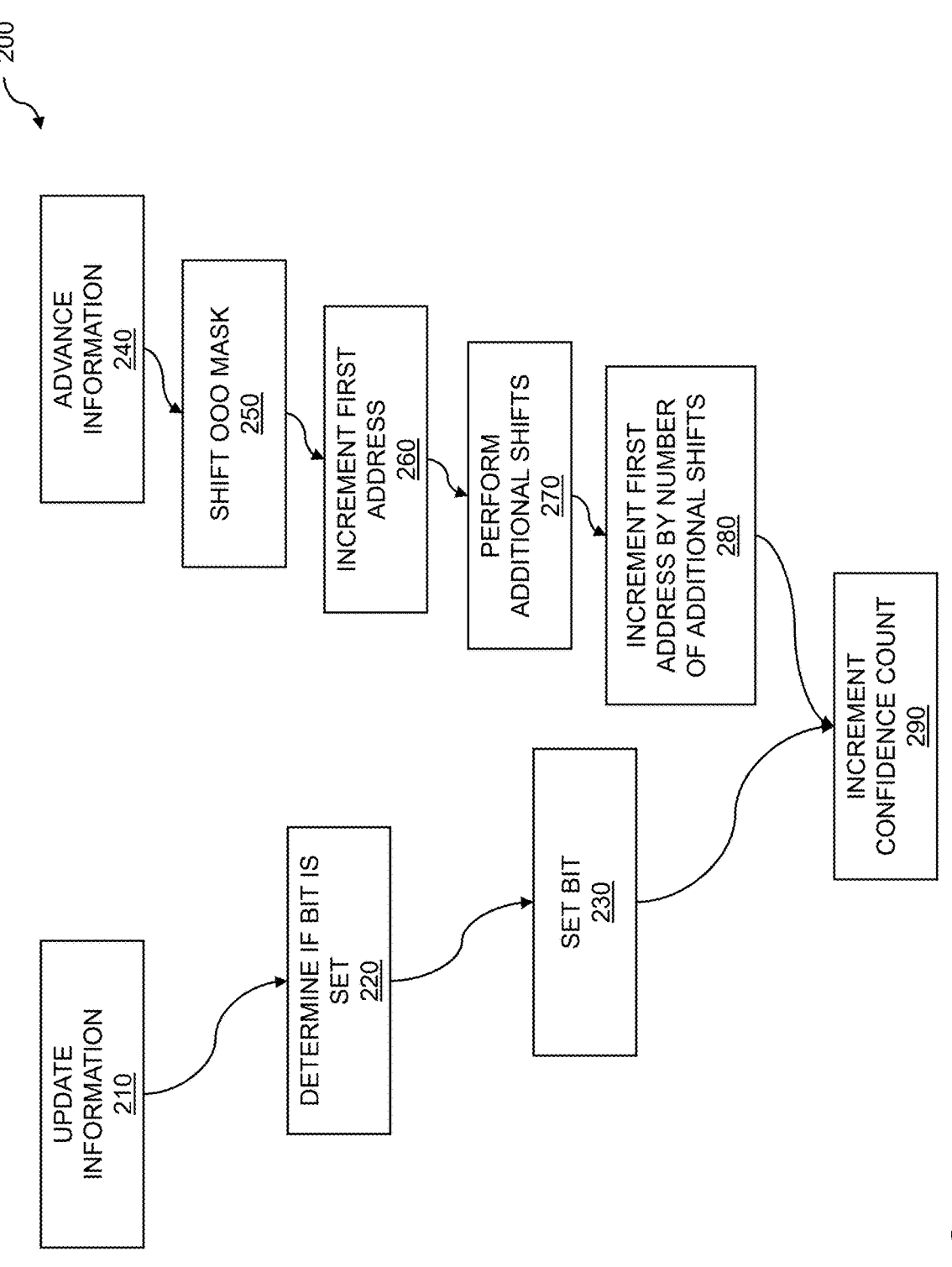
FIG. 2 is a flow diagram for controlling an out-of-order bit mask and confidence count.

FIG. 2 is a flow diagram for controlling an out-of-order bit mask and confidence count. The flow 200 includes updating information 210. The updating information can include updating an address field, an out-of-order mask field, and/or a confidence count field. The address field, out-of-order mask field, and confidence count field can be stored in an entry (row) of a prefetch table. The flow 200 can include determining if a bit is set 220. The bit can be a representative bit in the out-of-order mask that is set, where the representative bit indicates that the second address has been previously processed. This enables OOO unit stride data prefetching. The flow 200 can include setting the bit 230. The setting includes setting the representative bit, wherein the representative bit was previously not set. The flow 200 includes incrementing a confidence count 290. The incrementing of the confidence count can include incrementing the confidence count when the confidence count is below a threshold. The threshold can be a predetermined threshold, indicating a number of instruction accesses that occur before the data prefetcher is active. Prior to reaching the threshold, the data prefetch instruction locations are tracked via the out-of-order mask, but no data prefetching occurs. Once the predetermined threshold is reached, the data prefetcher enters a saturation state, and the data prefetcher becomes active. This technique can help reduce unnecessary prefetches for short data sequences. In one or more embodiments, the predetermined threshold can be programmed to configure the aggressiveness of the data prefetcher. A higher value for a predetermined threshold results in a more conservative data prefetching operation. Conversely, a lower value for a predetermined threshold results in a more aggressive data prefetching operation.

The flow 200 can include advancing the information 240. In one or more embodiments, the advancing comprises shifting the OOO mask 250. This can include shifting, to the right, the out-of-order mask by one bit. In one or more embodiments, the advancing occurs in response to a second data prefetch instruction that is sequential, such that the address of the second data prefetch instruction is the next sequential address after the first address that corresponds to a previously fetched data location. The flow 200 can include incrementing the first address 260. This can include incrementing the first address value in an address field within an entry of a prefetch table. The incrementing can occur based on detecting a sequential data prefetch instruction in an instruction stream. The sequential instruction can have a consecutive address in reference to the first instruction. As an example, with 32-bit addresses, a first instruction can have an address of 0x00001000, and a second instruction that is sequential can have an address of 0x00001004. The flow 200 can include performing additional shifts 270. The additional shifts can include performing a number of additional shifts to the right, on the out-of-order mask, until a least significant bit is 0. The flow 200 can include incrementing the first address by the number of additional shifts 280. Thus, embodiments can include incrementing the first address that was saved by the number of additional shifts to the right that were performed. The flow can then proceed to incrementing the confidence count 290 if the data prefetcher is not in the saturation state.

Disclosed embodiments provide a processor-implemented method for data prefetching comprising: accessing a processor core, wherein the processor core executes instructions out of order (OOO), wherein the processor core includes a local cache hierarchy, data prefetch logic, and a prefetch table, and wherein the processor core is coupled to an external memory system; detecting a first load instruction with a first address, wherein the first load instruction causes a miss in the local cache hierarchy; saving, in an entry of a prefetch table, information pertaining to the first load instruction, wherein the information includes the first address, a confidence count, and an out-of-order mask, and wherein the out-of-order mask comprises a number of bits; identifying a second load instruction with a second address, wherein the second address is inclusively between the first address and a maximum address, and wherein the maximum address is the first address plus N, wherein N is the number of bits; updating the information, wherein the second address is not a next sequential address following the first address, and wherein the updating is based on the detecting; advancing the information, wherein the second address is the next sequential address after the first address and wherein the advancing is based on the detecting; and issuing one or more data prefetch instructions to the second address plus an offset, wherein the confidence count is equal to a threshold value.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
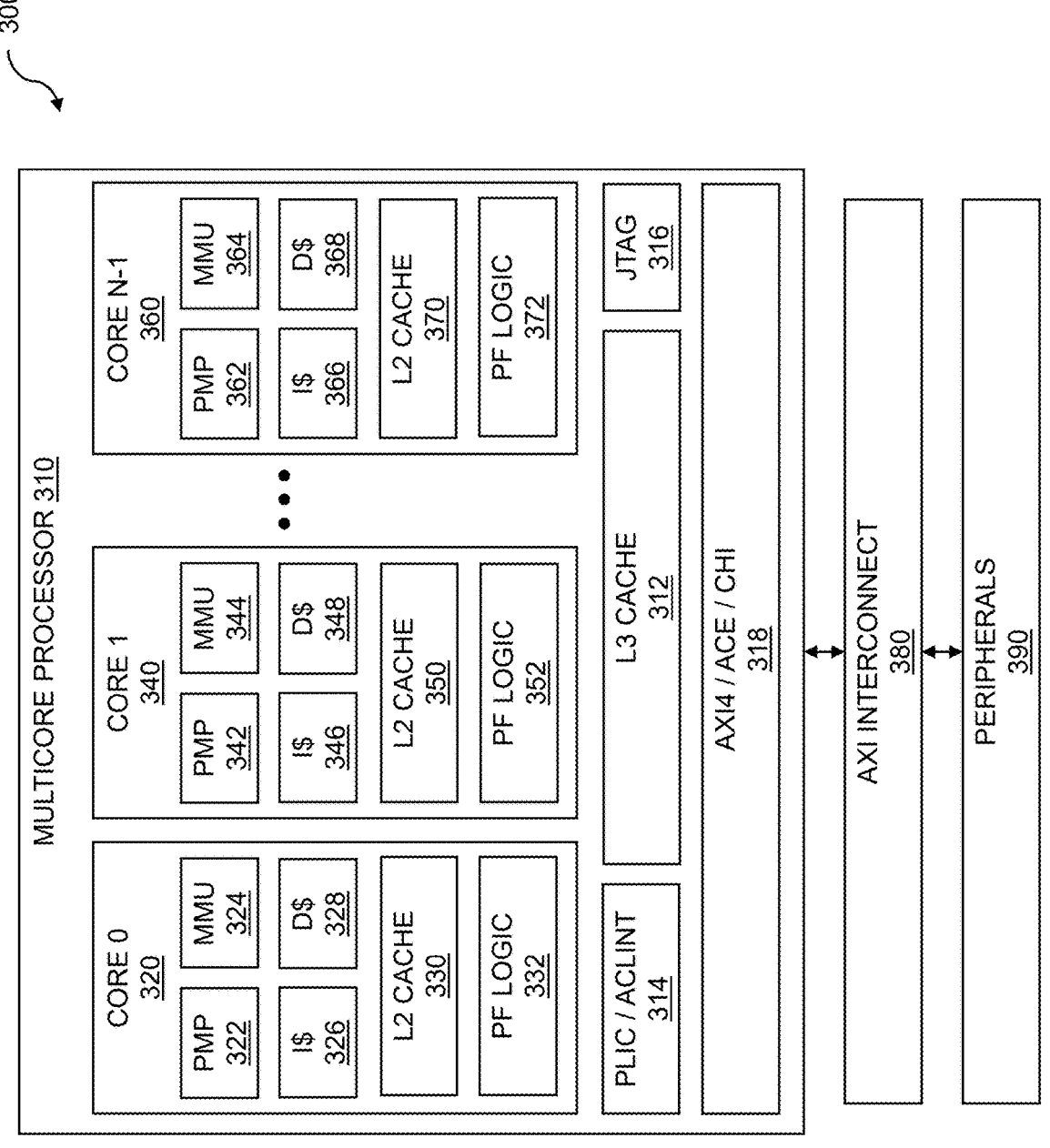
FIG. 3 is a block diagram illustrating a multicore processor.

FIG. 3 is a block diagram illustrating a multicore processor with an out-of-order unit stride data prefetcher with scoreboarding. In embodiments, the multicore processor can be a RISC-V™ processor, ARM™ processor, MIPS™ processor, or some other suitable processor type. The processor can include a multi-core processor, where two or more processor cores can be included. The processor, such as a RISC-V™ processor, can include a variety of elements. The elements can include processor cores, one or more caches, memory protection and management units (MMUs), local storage, and so on. The elements of the multicore processor can further include one or more of a private cache, a test interface such as a joint test action group (JTAG) test interface, one or more interfaces to a network such as a network-on-chip, shared memory, peripherals, and the like. The multicore processor is enabled by processor and network-on-ship coherency management. A plurality of processor cores is accessed. Each processor of the plurality of processor cores accesses a common memory through a coherent network-on-chip, and the coherent network-on-chip comprises a global coherency. A local cache is coupled to a grouping of two or more processor cores of the plurality of processor cores. Prefetcher logic can perform unit stride data prefetching on out-of-order (OOO) instructions so as to increase the ratio of cache hits to cache access attempts, thereby improving processor performance.

The block diagram 300 can include a multicore processor 310. The multicore processor can comprise two or more processors, where the two or more processors can include homogeneous processors, heterogeneous processors, etc. In the block diagram, the multicore processor can include N processor cores such as core 0 320, core 1 340, core N−1 360, and so on. Each processor can comprise one or more elements. In embodiments, each core, including cores 0 through core N−1, can include a physical memory protection (PMP) element, such as PMP 322 for core 0; PMP 342 for core 1, and PMP 362 for core N−1. In a processor architecture such as the RISC-V™ architecture, a PMP can enable processor firmware to specify one or more regions of physical memory such as cache memory of the shared memory, and to control permissions to access the regions of physical memory. The cores can include a memory management unit (MMU) such as MMU 324 for core 0, MMU 344 for core 1, and MMU 364 for core N−1. The memory management units can translate virtual addresses used by software running on the cores to physical memory addresses with caches, the shared memory system, etc.

The processor cores associated with the multicore processor 310 can include caches such as instruction caches and data caches. The caches, which can comprise level 1 (L1) caches, can include an amount of storage such as 16 KB, 32

KB, and so on. The caches can include an instruction cache I$326 and a data cache D$328 associated with core 0; an instruction cache I$346 and a data cache D$348 associated with core 1; and an instruction cache I$366 and a data cache D$368 associated with core N−1. In addition to the level 1 instruction and data caches, each core can include a level 2 (L2) cache. The level 2 caches can include an L2 cache 330 associated with core 0; an L2 cache 350 associated with core 1; and an L2 cache 370 associated with core N−1. The processor cores associated with the multicore processor 310 can include data prefetch logic. The data prefetch logic can include a prefetch table which can include multiple entries (rows), where each entry corresponds or relates to a data location that is fetched. Each core can include data prefetch logic. The data prefetch logic can include prefetch logic 332 associated with core 0; prefetch logic 352 associated with core 1; and data prefetch logic 372 associated with core N−1. The cores associated with the multicore processor 310 can include further components or elements. The further elements can include a level 3 (L3) cache 312. The level 3 cache, which can be larger than the level 1 instruction and data caches, and the level 2 caches associated with each core, can be shared among all of the cores. The further elements can be shared among the cores. In embodiments, the further elements can include a platform level interrupt controller (PLIC) 314. The platform level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide interprocessor functionalities such as interrupt and timer functionalities. The inter-processor interrupt and timer functionalities can be provided for each processor. The further elements can include a joint test action group (JTAG) element 316. The JTAG can provide a boundary within the cores of the multicore processor. The JTAG can enable fault information to a high precision. The high-precision fault information can be critical to rapid fault detection and repair.

The multicore processor 310 can include one or more interface elements 318. The interface elements can support standard processor interfaces including an Advanced eXtensible Interface (AXI™) such as AXI4™, an ARM™ Advanced eXtensible Interface (AXI™) Coherence Extensions (ACE™) interface, an Advanced Microcontroller Bus Architecture (AMBA™) Coherence Hub Interface (CHI™), etc. In the block diagram 300, the interface elements can be coupled to the interconnect. The interconnect can include a bus, a network, and so on. The interconnect can include an AXI™ interconnect 380. In embodiments, the network can include network-on-chip functionality. The AXI™ interconnect can be used to connect memory-mapped "master" or boss devices to one or more "slave" or worker devices. In the block diagram 300, the AXI interconnect can provide connectivity between the multicore processor 310 and one or more peripherals 390. The one or more peripherals can include storage devices, networking devices, and so on. The peripherals can enable communication using the AXI™ interconnect by supporting standards such as AMBA™ version 4, among other standards.

Figure 4:
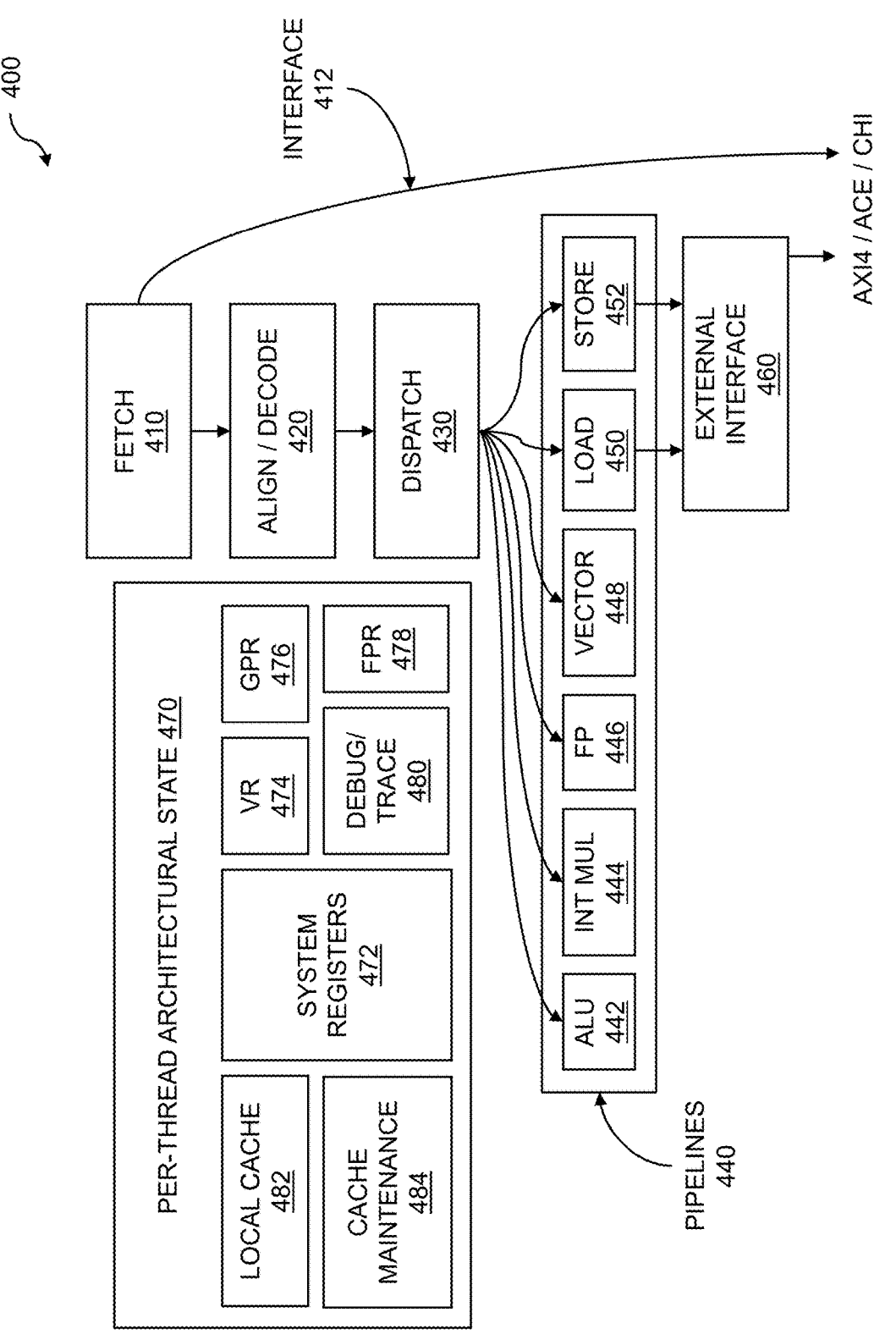
FIG. 4 is a block diagram for a pipeline.

FIG. 4 shows a block diagram 400 of a pipeline such as a core pipeline. The blocks within the block diagram can be configurable in order to provide varying processing levels. The varying processing levels can be based on processing speed, bit lengths, and so on. The block diagram 400 can include a fetch block 410. The fetch block 410 can include instruction and data prefetching logic. In embodiments, the prefetching logic can read a number of bytes from a cache such as a data cache (not shown). The number of bytes that are read can include 16 bytes, 32 bytes, 64 bytes, and so on. The data prefetching logic of disclosed embodiments may be performed by the fetch block 410. The prefetching can include unit stride data prefetching, and can support unit stride data prefetching with out-of-order (OOO) instructions. In other embodiments, the fetch block can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 412. The interface can include a standard interface such as one or more industry standard interfaces. The interfaces can include an Advanced eXtensible Interface (AXI™), an ARM™ Advanced eXtensible Interface (AXI™) Coherence Extensions (ACE™) interface, an Advanced Microcontroller Bus Architecture (AMBA™) Coherence Hub Interface (CHI™), etc.

The block diagram 400 includes an align and decode block 420. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The system block diagram 400 can include a dispatch block 430. The dispatch block can receive decoded instruction packets from the align and decode block. The decoded instruction packets can be used to control a pipeline 440, where the pipeline can include an in-order pipeline, an out-of-order (OOO) pipeline, etc. For the case of an in-order pipeline, the dispatch block can maintain a register "scoreboard" and can forward instruction packets to various processors for execution. For the case of an out-of-order pipeline, the dispatch block can perform additional operations from the instruction set. Instructions can be issued by the dispatch block to one or more execution units. A pipeline can be associated with the one or more execution units. The pipelines associated with the execution units can include processor cores, arithmetic logic unit (ALU) pipelines 442, integer multiplier pipelines 444, floating-point unit (FPU) pipelines 446, vector unit (VU) pipelines 448, and so on. The dispatch unit can further dispatch instructions to pipelines that can include load pipelines 450 and store pipelines 452. The load pipelines and the store pipelines can access storage such as the common memory using an external interface 460. The external interface can be based on one or more interface standards such as the Advanced eXtensible Interface (AXI™). Following execution of the instructions, further instructions can update the register state. Other operations can be performed based on actions that can be associated with a particular architecture. The actions that can be performed can include executing instructions to update the system register state, trigger one or more exceptions, and so on.

In embodiments, the plurality of processors can be configured to support multi-threading. The system block diagram can include a per-thread architectural state block 470.

The inclusion of the per-thread architectural state can be based on a configuration or architecture that can support multi-threading. In embodiments, thread selection logic can be included in the fetch and dispatch blocks discussed above. Further, when an architecture supports an out-of-order (OOO) pipeline, then a retire component (not shown) can also include thread selection logic. The per-thread architectural state can include system registers 472. The system registers can be associated with individual processors, a system comprising multiple processors, and so on. The system registers can include exception and interrupt components, counters, etc. The per-thread architectural state can include further registers such as vector registers (VR) 474, general purpose registers (GPR) 476, and floating-point registers 478. These registers can be used for vector operations, general purpose (e.g., integer) operations, and floating-point operations, respectively. The per-thread architectural state can include a debug and trace block 480. The debug and trace block can enable debug and trace operations to support code development, troubleshooting, and so on. In embodiments, an external debugger can communicate with a processor through a debugging interface such as a joint test action group (JTAG) interface. The per-thread architectural state can include local cache state 482. The architectural state can include one or more states associated with a local cache such as a local cache coupled to a grouping of two or more processors. The local cache state can include clean or dirty, zeroed, flushed, invalid, and so on. The per-thread architectural state can include a cache maintenance state 484. The cache maintenance state can include maintenance needed, maintenance pending, and maintenance complete states, etc.

Figure 5:
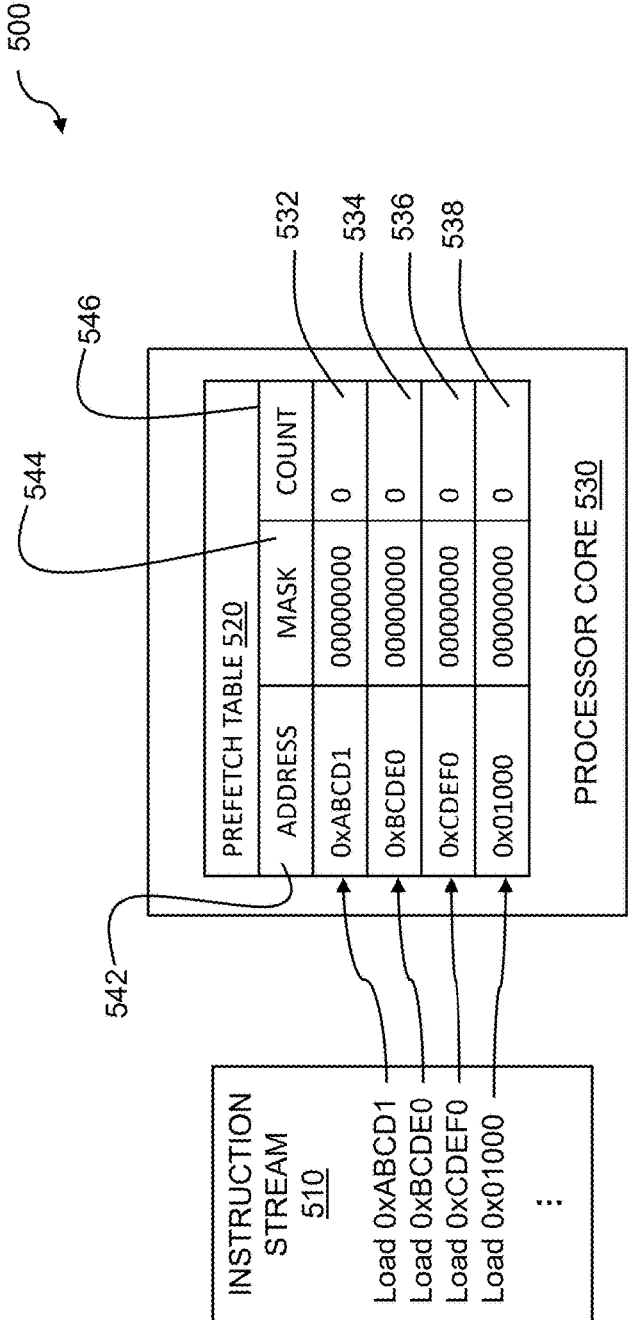
FIG. 5 is a block diagram for initializing a prefetch table.

FIG. 5 is a block diagram 500 for initializing a prefetch table. An instruction stream 510 includes a list of one or more load addresses. In one or more embodiments, the load addresses can represent the starting address for accessing a stream of data. Addresses from the instruction stream 510 are loaded into available entries in the prefetch table 520 that is stored within processor core 530. Each entry in the prefetch table is represented as a row. In the example of FIG. 5, the prefetch table 520 includes four rows (entries), indicated as 532, 534, 536, and 538. In practice, the prefetch table 520 can include more or fewer rows than that shown in FIG. 5. In some embodiments, the prefetch table can include 256 rows, 512 rows, 1024 rows, or some other suitable number of rows.

The prefetch table 520 comprises an address column 542, a mask column 544, and count column 546. The address column contains load addresses from the instruction stream 510. The mask column 544 contains an out-of-order mask value. The count column 546 contains a confidence count value. In embodiments, the out-of-order mask and confidence counter associated with the instruction at the address in the address column are initialized to zero values as shown in FIG. 5. In one or more embodiments, each entry in the prefetch table 520 can correspond to a different thread of execution, and/or a different function or entry point within a program/application or a different region of the address space. As shown in FIG. 5, each entry of the prefetch table 520 is in an initialized state, with both the mask and count values set to zero. Once a given entry is initialized, the address, mask, and/or count fields can be updated during the instruction fetch process to enable out-of-order unit stride prefetching. In one or more embodiments, once a thread, process, or application terminates, its corresponding entries in the prefetch table 520 are cleared. In embodiments, the clearing of a prefetch table entry can include setting the corresponding address value to NULL (zero). In some embodiments, an LRU (least recently used) algorithm may be used to allow new entries to overwrite entries that have not been used recently. This enables the currently executing threads, processes, and/or applications to use an entry in the prefetch table to take advantage of the OOO unit stride data prefetching to increase cache hits, thereby improving processer performance. In one or more embodiments, the prefetch table is indexed by a hashed program counter. This can reduce access times for the prefetch table, thereby further improving processor performance. The prefetch table can also be indexed by a hashed region address.

Figure 6:
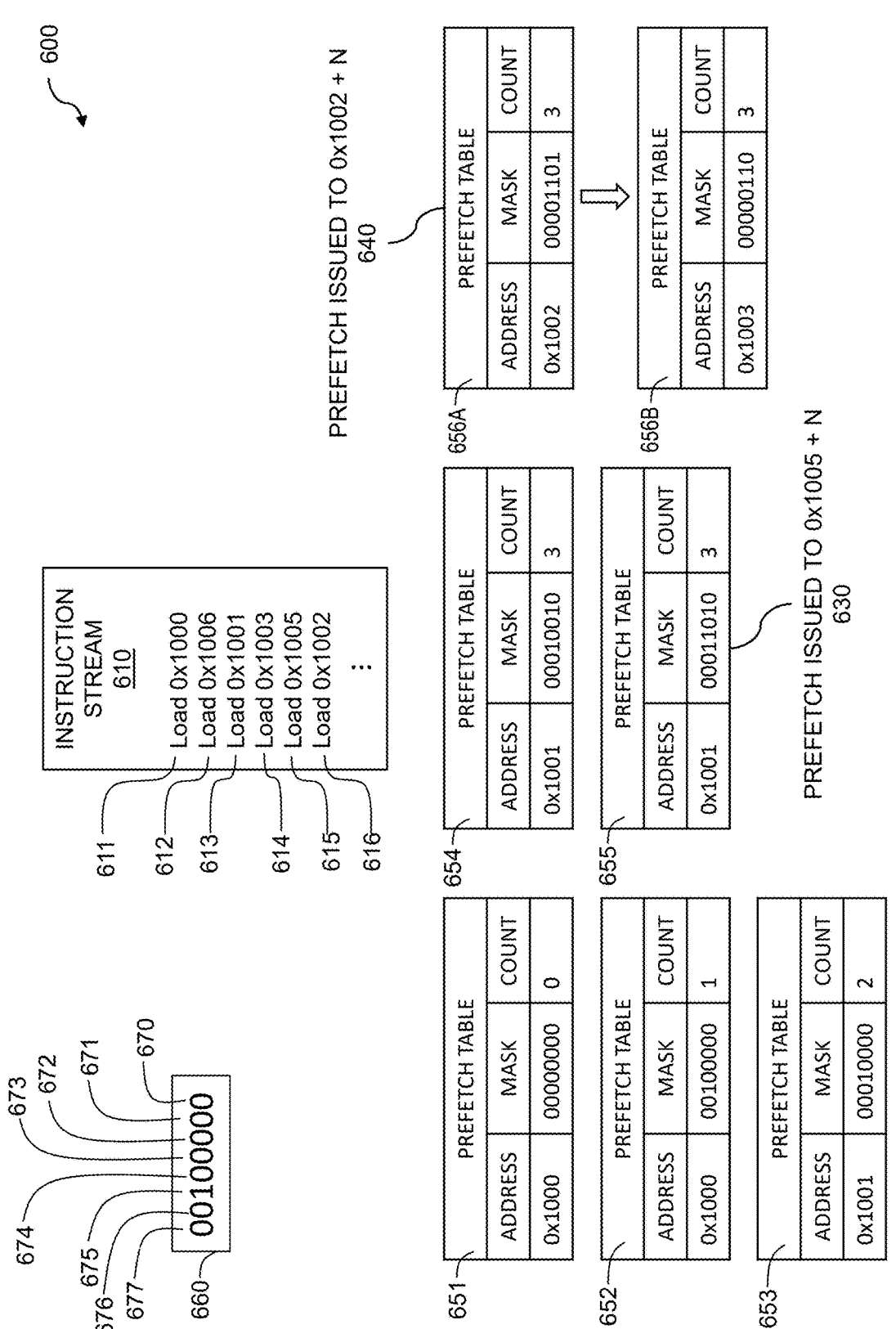
FIG. 6 is an illustration of an out-of-order unit stride data prefetcher with scoreboarding.

FIG. 6 is an illustration 600 of an out-of-order unit stride data prefetcher with scoreboarding. An instruction stream 610, which can be loads associated with a data stream, comprises a sequence of load instructions issued by the processor due to an event such as a miss in the data cache. The sequence of load instructions can represent accesses to a data stream with a unit stride. The loads within the stream can occur out of order (OOO). FIG. 6 shows the state of the prefetch table 620 at different stages in the sequence of load instructions. At 651, it shows the state of prefetch table 620 after load instruction 611, having an address of 0x1000. The mask and count are initialized to zeros at the start of the load sequence.

At 652 it shows the state of prefetch table 620 after load instruction 612 is encountered, having an address of 0x1006. This load is out of order (OOO) with respect to the previous load of 0x1000. In general, bit M−1 of the mask is set in response to an address that is M units away from the last address. An example of a mask is shown at 660, with bit 0 indicated at 670, bit 1 indicated at 671, bit 2 indicated at 672, bit 3 indicated at 673, bit 4 indicated at 674, bit 5 indicated at 675, bit 6 indicated at 676, and bit 7 indicated at 677. The address 0x1006 is six units away from the previous address of 0x1000. Thus, at 652, the mask value is set to 00100000, which represents bit 5 (M−1), with the rightmost digit of the mask considered as position zero, and the leftmost digit of the mask considered as position seven. The count field is incremented to a value of 1.

At 653 it shows the state of prefetch table 620 after a load instruction 613 is encountered in the instruction stream having an address of 0x1001. Since, in the example of FIG. 6, the preceding sequential address of 0x1000 was already encountered when load instruction 611 was encountered, a special recording process is performed. The special recording process includes incrementing the first address that was saved, and so the address value changes from 0x1000 at 652, to 0x1001 at 653. Additionally, information is advanced by shifting, to the right, the out-of-order mask by one bit. Thus, the value of the mask at 653 becomes 00010000, which is the value of the mask at 652, shifted to the right by one bit. The count value at 653 is incremented from 1 (at 652) to 2 (at 653). Thus, in embodiments, the detecting, updating, and advancing include a third load instruction with a third address inclusively between the first address and a maximum address, wherein the maximum address is the first address plus N, wherein N is the number of bits, and wherein the third load instruction occurs out of order with respect to the second load instruction.

At 654, it shows the state of prefetch table 620 after load instruction 614 is encountered, having an address of 0x1003. Since, in the example of FIG. 6, the next sequential address after 0x1001 has not yet been encountered (0x1002), the address value remains as 0x1001 at 654. The load address 0x1003 is two units away from the previous address of 0x1001. Thus, the M−1 bit is set (bit 1) and the mask value changes to 00010010, as compared to the mask value at 653, which does not have bit one set. The count value is incremented to 3, and in this example, the value 3 is a predetermined threshold which enables prefetching on subsequent data fetches.

At 655 it shows the state of prefetch table 620 after load instruction 615 is encountered, having an address of 0x1005. Since, in the example of FIG. 6, the next sequential address after 0x1001 has not been encountered (0x1002), the address value remains as 0x1001 at 655. The load address 0x1005 is four units away from the address field value in the prefetch table 620 of 0x1001. Thus, the M−1 bit is set (bit 3) and the mask value changes to 00011010, as compared to the mask value at 653, which does not have bit three set. As stated previously, in this example, the value 3 is a predetermined threshold which enables data prefetching. Since the count is already at a value of 3, it remains at 3, and now data prefetching occurs based on the current load instruction. Since the address of current load instruction 615 is 0x1005, the data prefetch is issued to instruction 0x1005+N, as indicated at 630, where N is an offset value. In one or more embodiments, the offset is programmable. In embodiments, the offset is programmed by writing a value into a configuration register of the processor. As an example, if the value of the offset N is 8, then the prefetch at 655 is a value of 0x1005+8, resulting in a prefetch of the instruction at address 0x100D.

At 656A it shows the state of prefetch table 620 after load instruction 616 is encountered, having an address of 0x1002. Now, in the example of FIG. 6, the next sequential address after 0x1001 is encountered. Thus, the address value increments to 0x1002 at 656A. The mask value right shifts, such that the value of the mask is 00001101. However, embodiments include performing a number of additional shifts to the right, on the out-of-order mask, until a least significant bit is 0. Thus, in embodiments, additional right shifts are performed on the mask until the LSB of the mask is 0. In the example of FIG. 6, one additional right shift changes the mask value from 00001101 at 656A to 00000110 at 656B. Additionally, the address is incremented for each right shift, and thus, at 656B, the address value is shown as incremented to 0x1003 from 0x1002 in 656A. Since the address of instruction 616 is 0x1002, the data prefetch is issued to instruction 0x1002+N, as indicated at 640, where N is the offset value. In one or more embodiments, the offset value is a predetermined constant. In some embodiments, the offset value can be programmable, such as by writing a value to a configuration register as previously stated. As an example, if the value of offset N is 8, then the data prefetch at address at 640 has a value of 0x1002+8, resulting in a prefetch of the instruction at address 0x100A. In some embodiments, the value of N can be based on the width of the mask field within the prefetch table. In those embodiments, when the mask is eight bits wide, the value of N is eight.

To summarize the operation, as the result of fetching data via the instruction stream 610, bit M−1 of the mask is set, where M is a difference between the address fetched from the instruction stream 610, and the address stored in the address field of prefetch table 620. Thus, at 652, data is fetched from address 0x1006 and the address in the address field is 0x1000. Thus, M=0x1006−0x1000=6, and bit M−1 (6−1=5), is set. Similarly, at 654, data is fetched from address 0x1003 and the address in the address field is 0x1001. Thus, M=0x1003−0x1001=2, and bit M−1 (2−1=1), is set. Similarly, at 655, data is fetched from address 0x1005 and the address in the address field is 0x1001. Thus, M=0x1005−

0x1001=4, and bit M−1 (4−1=3), is set. The combination of the address and the mask in the prefetch table control aspects of the data prefetcher operation. Accordingly, disclosed embodiments perform data prefetching based on out-of-order (OOO) instructions in an instruction stream. This can provide the benefits of recognizing data accesses to a stream via a unit stride even when those accesses occur out-of-order (OOO), thus providing a processor performance benefit.

Figure 7:
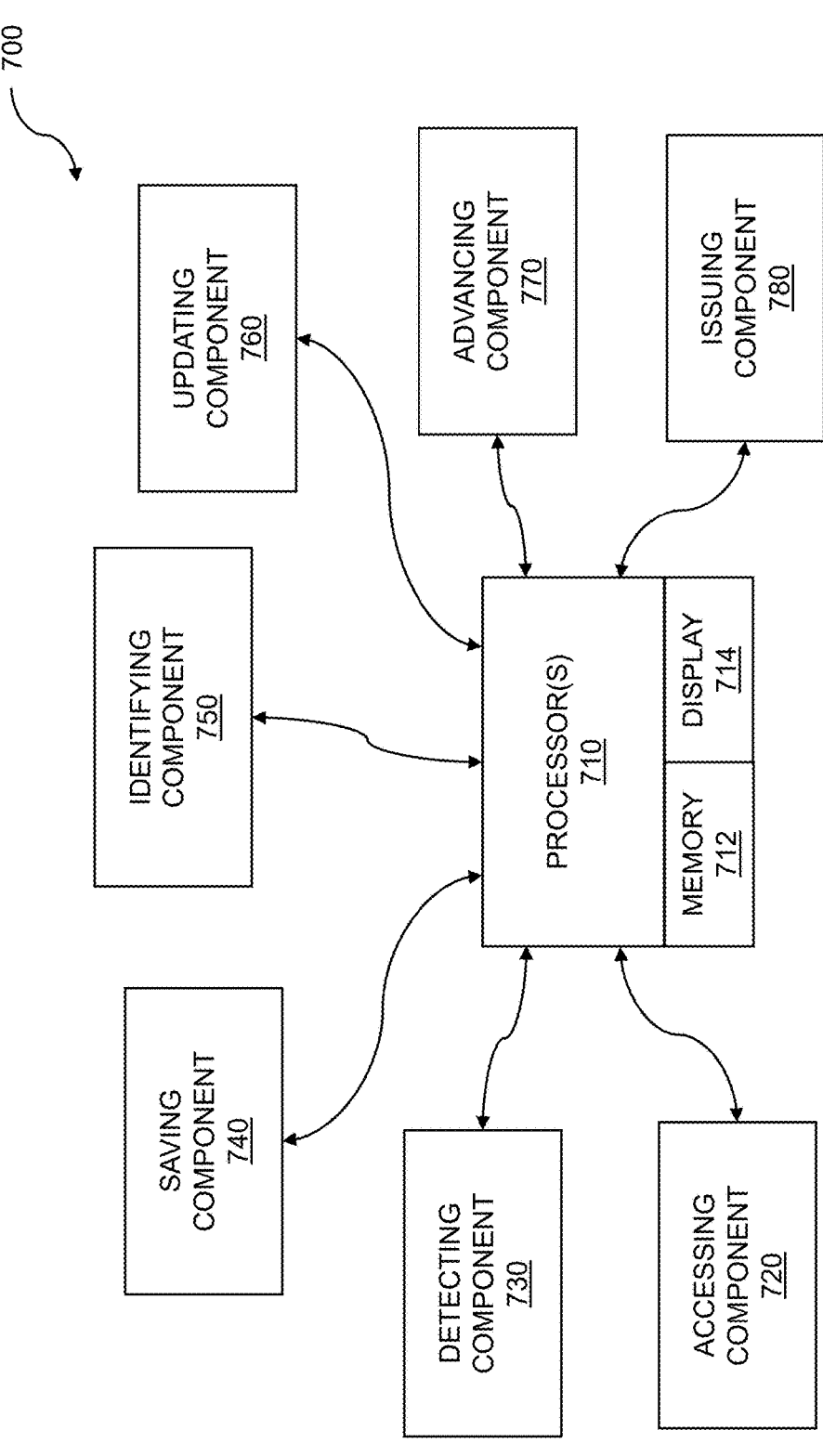
FIG. 7 is a system diagram for an out-of-order unit stride data prefetcher with scoreboarding.

FIG. 7 is a system diagram for an out-of-order unit stride data prefetcher with scoreboarding. The system 700 can include instructions and/or functions for design and implementation of integrated circuits that support out-of-order unit stride prefetching with scoreboarding. The system 700 can include instructions and/or functions for generation and/or manipulation of design data such as hardware description language (HDL) constructs for specifying structure and operation of an integrated circuit. The system 700 can further perform operations to generate and manipulate Register Level Transfer (RTL) abstractions. These abstractions can include parameterized inputs that enable specifying elements of a design such as a number of elements, sizes of various bit fields, and so on. The parameterized inputs can be input to a logic synthesis tool which in turn creates the semiconductor logic that includes the gate-level abstraction of the design that is used for fabrication of integrated circuit (IC) devices.

The system can include one or more of processors, memories, cache memories, displays, and so on. The system 700 can include one or more processors 710. The processors can include standalone processors within integrated circuits or chips, processor cores in FPGAs or ASICs, and so on. The one or more processors 710 are coupled to a memory 712, which stores operations. The memory can include one or more of local memory, cache memory, system memory, etc. The system 700 can further include a display 714 coupled to the one or more processors 710. The display 714 can be used for displaying data, instructions, operations, and the like. The operations can include instructions and functions for implementation of integrated circuits, including processor cores. In embodiments, the processor cores can include RISC-V™ processor cores. The system 700 can include an accessing component 720. The accessing component 720 can include functions and instructions for processing design data for accessing a processor core. The processor core can include a local cache hierarchy, prefetch logic, and a prefetch table, and where the processor core is coupled to an external memory system. The processor core can include FPGAs, ASICs, etc. In embodiments, the processor core can include a RISC-V™ processor core. The processor core can support prefetcher operations with out-of-order (OOO) unit stride data prefetching with scoreboarding, as previously described.

The system 700 can include a detecting component 730. The detecting component 730 can include functions and instructions for processing design data for detecting a first load instruction with a first address, wherein the first load instruction causes a miss in the local cache hierarchy. The local cache hierarchy can include a local cache, L2 cache, L3 cache, global cache, prefetch cache, and/or other cache structures. The system 700 can include a saving component 740. The saving component 740 can include functions and instructions for processing design data for saving, in an entry of a prefetch table, information pertaining to the first load instruction, wherein the information includes the first address, a confidence count, and an out-of-order mask, and wherein the out-of-order mask comprises a number of bits. The system 700 can include an identifying component 750.

The identifying component 750 can include functions and instructions for processing design data for identifying a second load instruction with a second address, wherein the second address is inclusively between the first address and a maximum address, and wherein the maximum address is the first address plus N, wherein N is the number of bits.

The system 700 can include an updating component 760. The updating component 760 can include functions and instructions for processing design data for updating the information, wherein the second address is not a next sequential address following the first address, and wherein the updating is based on the detecting. The updating can include updating an address field of a prefetch table with a new address. The new address can be a sequential address based on a previous address. The updating can include setting a bit in a mask within an entry of the prefetch table. The bit can be based on a difference between a load address from an instruction stream, and an address within the address field of an entry in the prefetch table. The updating can further include updating a count field within an entry of the prefetch table. The count field can represent a confidence count. The confidence count can be used as a criterion for determining when to perform a data prefetch. In one or more embodiments, the confidence count is incremented when data from a load instruction is fetched and the confidence count has not yet reached a predetermined threshold. In one or more embodiments, the confidence count is only incremented when the confidence count has not yet reached a predetermined threshold and the load instruction also results in a cache miss, enabling a more conservative prefetching operation. In one or more embodiments, this behavior is configurable by setting a bit within a register within a processor. The system 700 can include an advancing component 770. The advancing component 770 can include functions and instructions for processing design data for advancing the information, where the second address is not a next sequential address following the first address, and where the updating is based on the detecting. The advancing can include right shifting the mask, and/or incrementing the address field. The system 700 can include an issuing component 780. The issuing component 780 can include functions and instructions for processing design data for issuing one or more data prefetch instructions to the second address plus an offset, where the confidence count is equal to a threshold value. In some embodiments, the confidence count is set to a value ranging from 3 to 8. Other value ranges are possible in disclosed embodiments.

The system 700 can include a computer system for instruction execution comprising: a memory which stores instructions; one or more processors coupled to the memory wherein the one or more processors, when executing the instructions which are stored, are configured to: access a processor core, wherein the processor core executes instructions out of order (OOO), wherein the processor core includes a local cache hierarchy, data prefetch logic, and a prefetch table, and wherein the processor core is coupled to an external memory system; detect a first load instruction with a first address, wherein the first load instruction causes a miss in the local cache hierarchy; save, in an entry of a prefetch table, information pertaining to the first load instruction, wherein the information includes the first address, a confidence count, and an out-of-order mask, and wherein the out-of-order mask comprises a number of bits; identify a second load instruction with a second address, wherein the second address is inclusively between the first address and a maximum address, and wherein the maximum address is the first address plus N, wherein N is the number of bits; update the information, wherein the second address is not a next sequential address following the first address, and wherein the updating is based on the detecting; advance the information, wherein the second address is the next sequential address after the first address and wherein the advancing is based on the detecting; and issue one or more data prefetch instructions to the second address plus an offset, wherein the confidence count is equal to a threshold value.

The system 700 can include a computer program product embodied in a non-transitory computer readable medium for instruction execution, the computer program product comprising code which causes one or more processors to generate semiconductor logic for: accessing a processor core, wherein the processor core executes instructions out of order (OOO), wherein the processor core includes a local cache hierarchy, prefetch logic, and a prefetch table, and wherein the processor core is coupled to an external memory system; detecting a first load instruction with a first address, wherein the first load instruction causes a miss in the local cache hierarchy; saving, in an entry of the prefetch table, information pertaining to the first load instruction, wherein the information includes the first address, a confidence count, and an out-of-order mask, and wherein the out-of-order mask comprises a number of bits; identifying a second load instruction with a second address, wherein the second address is inclusively between the first address and a maximum address, and wherein the maximum address is the first address plus N, wherein N is the number of bits; updating the information, wherein the second address is not a next sequential address following the first address, and wherein the updating is based on the detecting; advancing the information, wherein the second address is the next sequential address after the first address and wherein the advancing is based on the detecting; and issuing one or more data prefetch instructions to the second address plus an offset, wherein the confidence count is equal to a threshold value.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions generally referred to herein as a "circuit," "module," or "system" may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for prefetching comprising:

accessing a processor core, wherein the processor core executes instructions out of order (OOO), wherein the processor core includes a local cache hierarchy, data prefetch logic, and a prefetch table, and wherein the processor core is coupled to an external memory system;

detecting a first load instruction with a first address, wherein the first load instruction causes a miss in the local cache hierarchy;

saving, in an entry of the prefetch table, information pertaining to the first load instruction, wherein the information includes the first address, a confidence count, and an out-of-order mask, and wherein the out-of-order mask comprises a number of bits;

identifying a second load instruction with a second address, wherein the second address is inclusively between the first address and a maximum address, and wherein the maximum address is the first address plus N, wherein N is the number of bits;

updating the information, wherein the second address is not a next sequential address following the first address, and wherein the updating is based on the detecting;

advancing the information, wherein the second address is the next sequential address after the first address and wherein the advancing is based on the detecting; and issuing one or more data prefetch instructions to the second address plus an offset, wherein the confidence count is equal to a threshold value.

2. The method of claim 1 wherein the updating further comprises determining if a representative bit in the out-of-order mask is set, wherein the representative bit indicates that the second address has been previously processed.

3. The method of claim 2 further comprising setting the representative bit, wherein the representative bit was previously not set.

4. The method of claim 3 further comprising incrementing the confidence count, wherein the confidence count is below a threshold.

5. The method of claim 4 wherein the threshold is programmable.

6. The method of claim 1 wherein the advancing further comprises shifting, to the right, the out-of-order mask by one bit.

7. The method of claim 6 further comprising incrementing the first address that was saved.

8. The method of claim 7 further comprising performing a number of additional shifts to the right, on the out-of-order mask, until a least significant bit is 0.

9. The method of claim 8 further comprising incrementing the first address that was saved by the number of additional shifts to the right that were performed.

10. The method of claim 9 further comprising incrementing the confidence count wherein the confidence count is below a threshold.

11. The method of claim 10 wherein the threshold is programmable.

12. The method of claim 10 further comprising preventing the incrementing the confidence count, wherein the confidence count is below a threshold, unless the second load instruction causes a miss in the local cache hierarchy.

13. The method of claim 12 wherein the threshold is programmable.

14. The method of claim 1 further comprising identifying when the second address is equivalent to the first address.

15. The method of claim 14 further comprising preventing the updating, the advancing, and the issuing.

16. The method of claim 1 wherein the saving further comprises initializing the out-of-order mask and confidence counter associated with the first load instruction.

17. The method of claim 1 wherein the detecting, updating, and advancing include a third load instruction with a third address inclusively between the first address and a maximum address, wherein the maximum address is the first address plus N, wherein N is the number of bits, and wherein the third load instruction occurs out of order with respect to the second load instruction.

18. The method of claim 1 wherein the offset is programmable.

19. The method of claim 1 wherein the prefetch table is indexed by a hashed program counter.

20. A computer program product embodied in a non-transitory computer readable medium for instruction execution, the computer program product comprising code which causes one or more processors to generate semiconductor logic for:

accessing a processor core, wherein the processor core executes instructions out of order (OOO), wherein the processor core includes a local cache hierarchy, prefetch logic, and a prefetch table, and wherein the processor core is coupled to an external memory system;

detecting a first load instruction with a first address, wherein the first load instruction causes a miss in the local cache hierarchy;

saving, in an entry of the prefetch table, information pertaining to the first load instruction, wherein the information includes the first address, a confidence count, and an out-of-order mask, and wherein the out-of-order mask comprises a number of bits;

identifying a second load instruction with a second address, wherein the second address is inclusively between the first address and a maximum address, and wherein the maximum address is the first address plus N, wherein N is the number of bits;

updating the information, wherein the second address is not a next sequential address following the first address, and wherein the updating is based on the detecting;

advancing the information, wherein the second address is the next sequential address after the first address and wherein the advancing is based on the detecting; and issuing one or more data prefetch instructions to the second address plus an offset, wherein the confidence count is equal to a threshold value.

21. A computer system for instruction execution comprising:

a memory which stores instructions;

one or more processors coupled to the memory wherein the one or more processors, when executing the instructions which are stored, are configured to:

access a processor core, wherein the processor core executes instructions out of order (OOO), wherein the processor core includes a local cache hierarchy, prefetch logic, and a prefetch table, and wherein the processor core is coupled to an external memory system;

detect a first load instruction with a first address, wherein the first load instruction causes a miss in the local cache hierarchy;

save, in an entry of the prefetch table, information pertaining to the first load instruction, wherein the information includes the first address, a confidence count, and an out-of-order mask, and wherein the out-of-order mask comprises a number of bits;

identify a second load instruction with a second address, wherein the second address is inclusively between the first address and a maximum address, and wherein the maximum address is the first address plus N, wherein N is the number of bits;

update the information, wherein the second address is not a next sequential address following the first address, and wherein updating is based on the detecting;

advance the information, wherein the second address is the next sequential address after the first address and wherein advancing is based on detecting; and issue one or more data prefetch instructions to the second address plus an offset, wherein the confidence count is equal to a threshold value.

* * * * *